United States Patent [19]
Dang

[11] Patent Number: 5,881,551
[45] Date of Patent: Mar. 16, 1999

[54] HEAT RECOVERY STEAM GENERATOR

[75] Inventor: Long V. Dang, Bloomfield, Conn.

[73] Assignee: Combustion Engineering, Inc., Windsor, Conn.

[21] Appl. No.: 934,656

[22] Filed: Sep. 22, 1997

[51] Int. Cl.$^6$ ..................................................... F02C 6/00
[52] U.S. Cl. ..................... 60/39.182; 165/101; 122/7 B; 122/235.17; 122/235.23
[58] Field of Search .............................. 60/39.12, 39.182; 122/7 R, 7 B, 235.17, 235.23; 165/101, 145, 921

[56] References Cited

U.S. PATENT DOCUMENTS

| | | |
|---|---|---|
| 4,706,612 | 11/1987 | Moreno et al. ........................ 60/39.182 |
| 5,419,284 | 5/1995 | Kobayashi et al. ...................... 122/7 B |

*Primary Examiner*—Noah P. Kamen
*Attorney, Agent, or Firm*—Robert S. Smith

[57] ABSTRACT

A heat recovery steam generator system which includes a plurality of side waterwalls defining an enclosure and a waterwall divider extending within the enclosure to define first and second chambers within the enclosure. The first chamber has an inlet and an outlet; and the second chamber has first and second inlets and an outlet, the first inlet of the second chamber is in fluid communication with the outlet of the first chamber, and a plurality of boiler bank tubes extend through the second chamber. Some forms of the invention have ducting for connecting the exhaust of an associated gas turbine partially to the inlet of the first chamber and partially to the second inlet of the second chamber. A plurality of burners may be disposed at the inlet of the first chamber and the system may also include a forced draft blower for blowing ambient air and ducting coupling the forced draft blower to the inlet of the first chamber.

11 Claims, 2 Drawing Sheets

HEAT RECOVERY STEAM GENERATOR

BACKGROUND OF THE INVENTION

The invention relates to heat recovery steam generators (HRSG's). While the invention has particular application to recovering heat from the exhaust of a gas turbine used to generate electric power, it will be understood that the invention has other applications particularly where a fluid stream exhausting from a given process contains oxygen to support combustion.

Gas turbines have been widely used to generate electric power. The thermal efficiency of gas turbines is low because of high exit-gas temperatures (800° to 1000° F., or 425° to 540° C.) and high excess-air levels (220 to 300 percent) in the combustion products. The thermal energy remaining in the exhaust gas can be recovered in a heat-recovery boiler to produce additional electricity using a steam-turbine generator. The combined output of electricity from the gas turbine and the steam turbine is 30 to 50 percent greater than that obtained from the gas turbine alone, with no additional fuel input. Other heat recovery steam generators may include supplementary firing.

Supplementary fired heat-recovery steam generators use firing equipment located in the exhaust gas stream in the boiler inlet transition duct. Since gas-turbine exhaust contains 75 to 80 percent of the oxygen normally found in atmospheric air, fuel may be burned without the need for additional fresh air. By using duct burners (or other similar burners), gas-turbine exhaust temperatures can be increased to 1500° to 1600° F. (815° to 870° C. supplementary firing generally doubles steam output of the heat recovery boiler by providing a mechanism for varying steam production and matching process steam demand, independent of the gas turbine electricity production.

Boilers that are substantially assembled in a shop and in shipped to site for installation and operation, sometimes called "package boilers" have relatively low overall installed costs. Standardization is the key to reduced costs. Standardization of design saves time and money prior to actual fabrication of a shop assembled unit. Even greater savings are achieved in manufacturing. Standard shop assembled boilers are built under controlled conditions which permit a high quality product at low cost. The assembly area is arranged for optimum materials flow both of parts fabricated for individual units and for parts and materials to be taken from stock. No delays are encountered due to adverse weather conditions. Site preparation is minimal since most units require only a concrete slab foundation. No errection space or material storage space is required at the site.

Known package boilers typically have a single flow path for the products of combustion passing out of the gas turbine. Various heat exchanging surfaces are serially disposed in the single flow path. The total flow capacity for a given pressure drop across the boiler has a finite limit. Often this limit is not sufficiently large for many applications. The size of the package boiler cannot be increased to increase capacity because the maximum size is limited by the transport apparatus. For example, the size is limited by the size of available trucks, rail cars, and barges. The conventional package boiler does not lend itself to use as a heat recovery steam generator because the conventional structure will excessively restrict flow of exhaust gases from the gas turbine. Ordinarily, the logical alternative to is to build a larger boiler at the operating site that is much larger and much more expensive.

A primary object of the invention is to utilize a know package boiler with it's inherent advantages and to adapt the construction of a known package boiler to the requirements of a heat recovery steam generator.

It is also an object of the invention to modify the construction of a known package boiler to increase the gas flow capacity through the boiler so that the boiler does not restrict the flow of gas out of the gas turbine with which it cooperates.

A related object of the invention is to permit the use of a given package boiler for applications that would ordinarily require the construction of a larger package boiler or the construction at the site of a larger boiler at much greater expense.

Another object of the invention is to utilize substantial parts of the known package boiler to attain the efficiencies in design and manufacturing inherent in such known designs.

Still other object of the invention is to provide apparatus that will have good thermodynamic properties.

SUMMARY OF THE INVENTION

It has now been found that these and other objects of the invention may be attained in a heat recovery steam generator system which includes a plurality of side waterwalls defining an enclosure and a waterwall divider extending within the enclosure to define first and second chambers within the enclosure. The first chamber has an inlet and an outlet; and the second chamber has first and second inlets and an outlet, the first inlet of the second chamber is in fluid communication with the outlet of the first chamber; and a plurality of boiler bank tubes extend through the second chamber.

Some forms of the invention have ducting for connecting the exhaust of an associated gas turbine partially to the inlet of the first chamber and partially to the second inlet of the second chamber. A plurality of burners may be disposed at the inlet of the first chamber and the system may also include a forced draft blower for blowing ambient air and ducting coupling the forced draft blower to the inlet of the first chamber. The system may also include an economizer disposed in fluid communication with the outlet of the second chamber.

The system also includes in some forms of the invention a stack for exhausting gases from the associated gas turbine when these gases are not being used in the heat recovery steam generator system as well as a duct to direct the gases exiting the economizer to the stack for exhausting gases from the associated gas turbine. The second chamber may include a barrier that is generally planar and aligned with the outlet of the second chamber whereby flow from the first inlet to the second chamber and flow from the second inlet to the the second chamber is directed out the outlet of the second chamber.

In some forms of the invention the outlet of the forced draft blower, ducting from be associated gas turbine, the inlet to the first chamber and the second inlet to the second chamber are in fluid communication. The apparatus may also include a louvre intermediate the forced draft blower and the first inlet of the first chamber and a louvre intermediate the second inlet of the second chamber and the forced draft blower.

BRIEF DESCRIPTION OF THE DRAWING

The invention will be better understood by reference to the accompanying drawing in which.

DESCRIPTION OF THE PREFERRED EMBODIMENT

Figure 2:
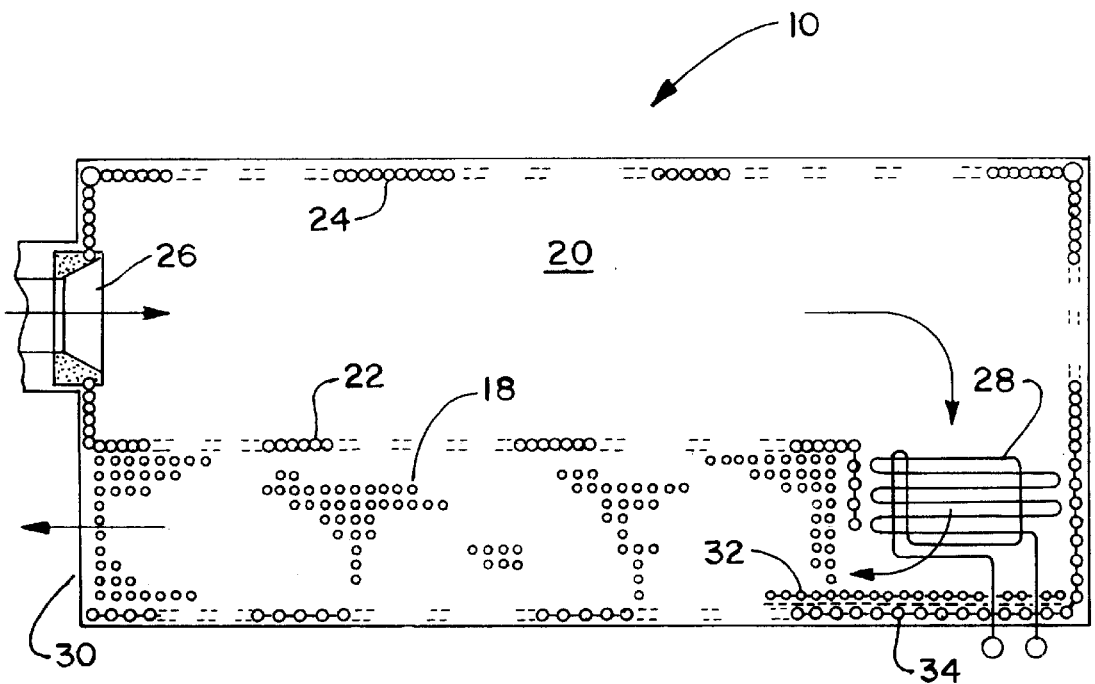
FIG. 2 is a plan view of a prior art D type boiler.
Figure 3:
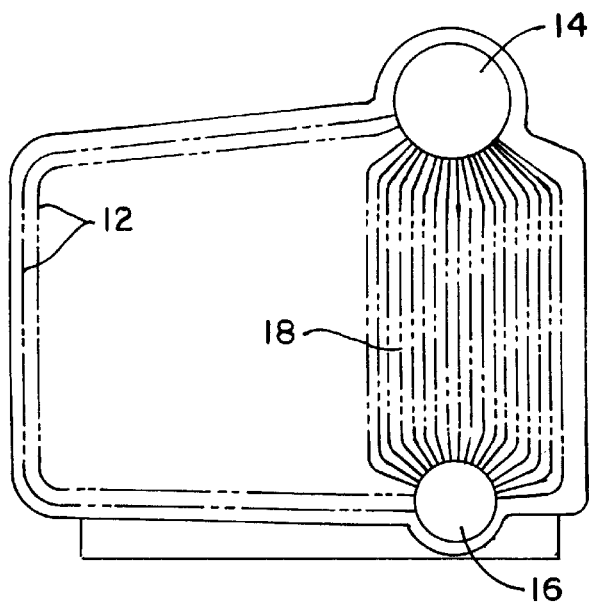
FIG. 3 is a cross-sectional view taken along a vertical plane extending through the boiler illustrated in FIG. 2 and which further illustrates the boiler bank tubes.

The invention will be best understood after a review of the known Combustion Engineering VP type boiler 10 illustrated in FIGS. 2 and 3. The VP boiler 10 is a typical shop assembled boiler configuration. The VP boiler 10 is also referred to as D type boiler because of the shape of the boiler tubes 12. That shape it is visible in FIG. 3. The boiler 10 includes an upper steam drum 14, and a lower steam drum 16. The boiler 10 includes a vertical bent tube boiler bank 18 that is isolated from a furnace section 20 by a baffle wall 22. The side wall of the furnace 20 is a tube and fin watercooled construction 24. Because of the high temperatures in the furnace the walls 22, 24 defining the enclosure as well as the internal divider are membrane walls. Each membrane wall is formed by a plurality of mutually parallel tubular members in which each tubular member is joined on opposed sides thereof by respective plates to adjacent tubular members. A steam and water mixture flows through the tubular members or tubes. Such membrane walls are also referred to as tube and fin walls or waterwalls.

Hot gas from the associated gas turbine (not shown) flows in an inlet 26 and continues through the entire length of the furnace 20 and then passes over a superheater 28. Thereafter, the gases flow through the boiler bank section 18 to an exit 30. Disposed intermediate a heat protective membrane wall 32 and the tube and fin watercooled wall 24 are unheated downcomers 34. Those skilled in the art will understand that the downcomers 34 connect the steam drum 14 to the lower steam drum 16 and cooperate with the risers 12 to promote circulation between the upper steam drum 14 and the lower steam drum 16. Further description of this prior art apparatus appears in the publication *Combustion Fossil Power* edited by Joseph G. Singer, P. E. and published by ABB Combustion Engineering, Inc. of Windsor, Conn. 06095 (1991 edition) pages 8-38 to 8-39.

The preferred embodiment of the apparatus in accordance with the present invention modifies the construction of the boiler shown in FIGS. 2 and 3 in a number of ways and adds external elements to the system. The present invention modifies the existing boiler 10 by providing a dual gas path configuration. The standard "D" type boiler design is an advantageous type of boiler for implementing the present invention because that boiler requires relatively simple hardware modifications and the addition of relatively simple gas ducting arrangements. Cost reduction is achieves by increasing the boiler gas handling capacity by about 100 percent.

A primary requirement for this application is that the overall system gas pressure drop be under 10 inches of water gauge. Other requirements are that the exhaust gas have a low stack gas temperature and the system have the capability to be fired with supplemental firing to generate more steam. Ideally the system should be capable of instantly switching from operating with the exhaust gas from an associated gas turbine to operation with the an ambient air supply from a blower and the burners that all are part of the boiler 10. The system construction in accordance with the present invention enables the use of the existing package boiler, with modifications, for much larger applications to the satisfying the ten inches of water gauge total gas pressure drop the combined superheater and boiler bank gas pressure loss typically must be kept under five in of water gauge. Conventional package boilers have relatively small superheater and boiler bank flow areas. Thus, they have a relatively high pressure drop at high flow rates. A typical large package boiler design will accommodate a gas flow rate off about 500,000 pounds per hour and will produce steam at the rate of 400,000 to 500,000 pounds per hour in a fresh air firing boiler application. A typical heat recovery steam recovery generator that will handle the same gas flow rate will produce steam at the rate of 150,000 to 200,000 pounds per hour. Thus, a standard steam package boiler is significantly oversized with respect to its steam generating capacity when used as a heat recovery boiler. The dual gas path configuration in accordance with the present invention effectively removes the inherent mismatch in boiler performance.

Boiler gas flow configurations currently utilized in waste heat recovery boiler applications are sometimes inefficient or require additional heat exchanging equipment. In one known configuration part of the total inlet gas flow is directly bypassed to the economizer. Steaming of the economizer due to large heat capacity of the re-combined flow entering the economizer severely limits the amount of gas that can be bypassed. A more significant reduction of the boiler gas flow is achieved in another arrangement where the bypassed steam is passed through an evaporator prior to entering the economizer. However, this configuration introduces an additional major component with significant increase in cost and complexity to the overall system.

Figure 1:
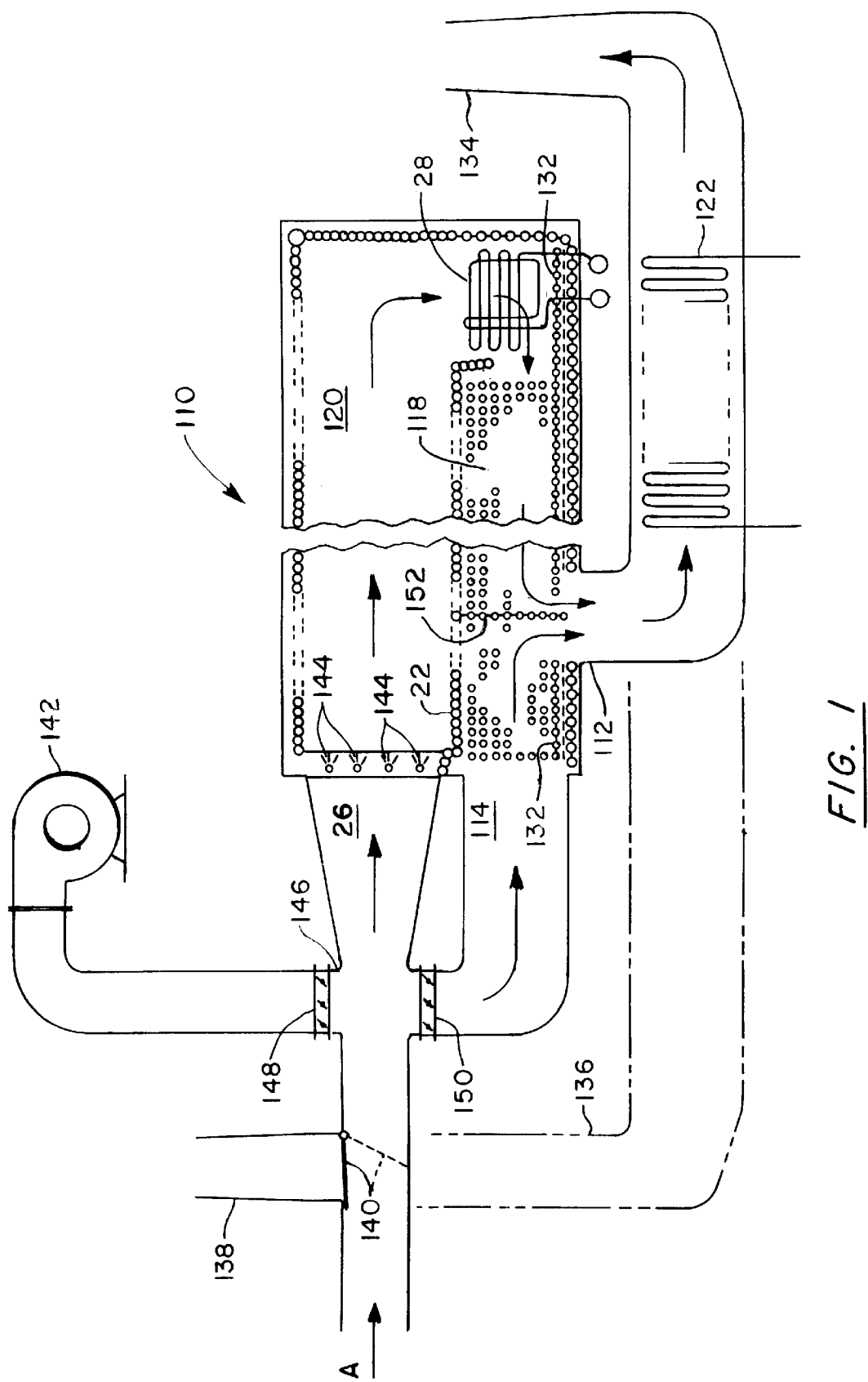
FIG. 1 is a partially schematic plan view of a boiler system in accordance with one form of the present invention.

The apparatus in accordance with a preferred form of the invention illustrated. in a FIG. 1 provides two parallel flow paths into the boiler to 110. The modifications to the existing apparatus shown in FIGS. 2 and 3 include the following:

1. Providing a boiler bank side wall outlet 112 that is larger and the outlet 30 of the boiler 10. The precise location in the side of the boiler bank 118 will depend on the particular application. FIG. 1 illustrates the outlet 112 disposed at approximately a point which is approximately one-third of the total axial extent of the boiler bank 118. For other applications the outlet 112 may be disposed more nearly at the axial midpoint of the boiler bank 118.

2. The outlet 30 of the boiler 10 is replaced by a new inlet 114. The structure will be generally the sames as the existing outlet.

3. The prior art membrane wall 32 isolates one row of the boiler bank tubes 18 to provide unheated downcomers 34. In the apparatus in accordance with a preferred form of the invention a membrane wall 132 isolates the row of boiler bank 18 a new tubes. More specifically, the membrane wall 132 isolates a row of tubes tubes within the boiler bank 118 that are most remote from the furnace 120. Obviously, the membrane wall 132 cannot extend across the outlet 112. Thus, the membrane wall 132 has a discontinuity at the outlet 112. The installation of the membrane wall 132 inherently thermal isolates the row of tubes within the boiler bank 118 that are most remote from the furnace and inherently produces a row of unheated downcomers to produce better circulation between the upper steam drum 14 and the lower steam drum 16. It will be understood that the structure of the apparatus in accordance with the present invention is substantially the same as the structure shown in FIGS. 2 in 3 except for the enumerated changes. Thus, the structure of the present invention induces the upper steam drum 14, lower steam drum 16 and risers 12.

4. Adding helix shaped fins to a plurality of the boiler bank tubes that are near the inlet 114.

5. Adding an economizer 122 with appropriate ducting coupled to the outlet 112 of the boiler 110. The output of the economizer may be exhausted to ambient by a way of a stack 134. In other embodiments the output of the economizer is routed by way of a duct 136 to a common stack 138. The common stack 138 is coupled by means of a flapper valve 140 that allows flow, designated by the arrow A, from the associated gas turbine (not shown) to either pass up the common stack 138 or flow into the furnace 120.

6. Add a blower 142 that will force ambient air into the conventional inlet 26. Burners 144 are added at the inlet 26. The burners 144 are preferably fired by gas and heat the ambient air, provided by the blower 142, within the furnace 120.

7. Addition of a planar barrier 152 within the boiler bank 118 that is generally perpendicular to the wall 22 and coincident with a plane that passes through the centerline of the outlet 112. The planar barrier may be a achieved by installing fins intermediate a row of tubes within the boiler bank 118 or by other structure. The purpose of this barrier is to direct both the flow of (a) gas entering the inlet 114 and passing out the outlet 112 and (b) the flow of gas entering inlet 26, continuing through the furnace 120, over the superheater 28 and out the outlet 112. Thus, the barrier 152 helps to direct the flow of gas coming from both the left (as viewed) and from the right (as viewed).

8. Add a duct connector 146 together with adjustable louvres 148 and 150.

The last change is necessary to accommodate the three different operating modes of the resulting system. The three different modes are:

(a) gas turbine exhaust flows into the boiler 110 without firing the burners 144. Maximum flow is possible when the louvre 150 is opened and the louvre 148 is closed. Thus, a duel flow path is achieved with gas turbine exhaust gas entering both the inlet 26 and the inlet 114 before passing out the outlet 112 and over the economizer 122.

(b) gas turbine exhaust flows into the boiler 110 with firing of the burners 144. The flow paths are identical to that in mode (a). The difference is that additional heat is provided by the burners 144.

(c) blower air from the blower 142 passes through the open louvre 148 and is directed into the inlet 26 by the dosed louvre 150 and flapper valve 140 positioned so that all exhaust gases A to are directed up the stack 138.

The fired stream in the apparatus of the present invention is substantially the same as a typical boiler application. There is fuel firing by burners installed at the furnace front wall and combustion gas passing through the boiler furnace, to the superheater and generating bank before exiting at the bank outlet 112. The unfired stream enters the inlet 114 as the front of the generating bank and flows in the opposite direction to the direction of the fired stream. After exchanging heat the unfired gas stream exits the boiler 110 and combines with the fired stream at the common boiler outlet 112. The combined stream is directed through an economizer 122 and exhausted through the boiler stack 134 or alternatively through a common stack 138. This parallel gas flow arrangement into the boiler 110 eliminates the gas flow area limitation without requiring an additional heat exchanger.

The mass flow ratio of the two streams is primarily a function of the combined boiler outlet gas temperature to avoid steaming the economizer, the amount of oxygen needed to support the firing rate, and the allowable pressure losses in the gas streams. For typical cases in which the fuel net heat input is in the range of 100 to 150 percent of the incoming gas sensible heat content, the optimum mass ratio of the fired to unfired gas stream is about 2:3. A flow control damper is installed on the unfired stream inlet duct to balance the parallel flow circuit Spiral fins are provided on some of the tubes in the boiler bank near the boiler front. This modification is required in the certain cases to reduce the total length of the boiler bank. This section is exposed to less than 1100 degrees Fahrenheit gas. Thus, the environment allows the use of carbon steel fins. It will be understood that bare boiler bank tubes upstream of the fired stream reduced the gas temperature to this level and the incoming unfired stream is normally under 1100 degrees Fahrenheit in gas turbine applications. When finned tubes are used the reduction in overall boiler length is limited by flame lengths, furnace heat release rates and steam drum length to support evaporation rates. These limits are inherent in a standard boiler designed while those limitations resulting from using a package boiler as a waste the boiler are eliminated by using the apparatus in accordance with the present invention.

Another advantage to using the apparatus in accordance with the present invention is that it provides the ability to maintain similar furnace gas conditions at the entrance to the superheater under different operating conditions. This is particularly useful when the boiler is required to be designed for fresh air firing capability. The gas flow rates and temperatures to the superheater can be closely matched between the fresh air firing and supplemental firing mode. This helps simplify the superheater design, reduced performance prediction uncertainties and the physical size of the superheater. Similarly, the boiler bank performance in fresh air closely matches that of the fired stream in the supplemental firing mode. Note that the unfired stream flow control damper is positioned in the closed position during operation in fresh air mode.

The boiler 110 has a full water cooled furnace construction that is well-suited for the preferred embodiment of the present invention. More particularly, the boiler 110 is particularly suitable because the furnace gas conditions are similar to those in a conventional boiler applications. This standard design feature enables boilers to be competitive with conventional HRSGs (heat recovery steam generators) particularly when high firing rates are required. Conventional heat recovery steam generators that fire a supplemental fuel in a duct that is not water cooled entirely with turbine exhaust gas flow, have a practical supplemental firing limit in the order of 70 percent of the incoming turbine exhaust gas sensible heat content. This is a condition where adiabatic combustion gas temperatures approach the 1700 degrees Fahrenheit range. Bypassing of the inlet gas flow will result in higher combustion gas temperatures. Furnace designs with partial or full water cooled walls are generally required to accommodate higher firing rates While the dual flow configuration of the present invention is particularly suitable for a "D" type boiler it will be understood that the invention also has application to other boiler constructions. Another application for the dual gas path apparatus is in the retrofitting of existing boilers to provide the capability of functioning as supplemental fired waste heat boilers.

The invention has been described with respect to its preferred embodiment. Persons skilled in the art of such devices may upon exposure to the teachings herein conceive other variations. Such variations are deemed to be encompassed by the disclosure, the invention being delimited only by the following claims.

Having thus described my invention, I claim:

1. A heat recovery steam generator system which comprises:

a plurality of side waterwalls defining an enclosure having first and second ends; a a waterwall divider extending within said enclosure to define first and second chambers within said enclosure;

said first chamber having an inlet and an outlet; and said second chamber having first and second inlets and an outlet, said first inlet of said second chamber being in fluid communication with said outlet of said first chamber; said inlet of said first chamber and said second inlet of said second chamber being disposed respectively at said first and second ends of said enclosure and a plurality of boiler bank tubes extending through said second chamber.

2. The system as described in claim 1 further including:

ducting for connecting the exhaust of an associated gas turbine partially to said inlet of said first chamber and partially to said second inlet of said second chamber.

3. The system as described in claim 2 further including:

a plurality of burners disposed at said inlet of said first chamber.

4. A heat recovery steam generator system which comprises:

a plurality of side waterwalls defining an enclosure;

a waterwall divider extending within said enclosure to define first and second chambers within said enclosure;

said first chamber having an inlet and an outlet; and said second chamber having first and second inlets and an outlet, said first inlet of said second chamber being in fluid communication with said outlet of said first chamber; and a plurality of boiler bank tubes extending through said second chamber, ducting for connecting the exhaust of an associated gas turbine partially to said inlet of said first chamber and partially to said second inlet of said second chamber, a plurality of burners disposed at said inlet of said first chamber and a forced draft blower for blowing ambient air and ducting coupling said forced draft blower to said inlet of said first chamber.

5. The system as described in claim 4 further including:

an economizer disposed in fluid communication with said outlet of said second chamber.

6. The system as described in claim 5 wherein:

the system further includes a stack for exhausting gases from the associated gas turbine when these gases are not being used in the heat recovery steam generator system.

7. The system as described in claim 6 wherein:

the gases exiting said economizer are ducted to a stack for exhausting gases from the associated gas turbine.

8. The system as described in claim 7 wherein:

said second chamber includes a barrier that is generally planar and aligned with said outlet of said second chamber whereby flow from said first inlet to said second chamber and flow from said second inlet to the said second chamber is directed out said outlet of said second chamber.

9. The system as described in claim 8 wherein:

the outlet of said forced draft blower, ducting from the associated gas turbine, said inlet to said first chamber and said second inlet two said second chamber are in fluid communication.

10. The system as described in claim 9 wherein:

said system further includes a louvre intermediate said forced draft blower and said first inlet of said first chamber.

11. The system as described in claim 10 wherein:

said system further the includes a louvre intermediate said second inlet of said second chamber and said forced draft blower.

* * * * *